US010612999B2

United States Patent
Ide et al.

(10) Patent No.: US 10,612,999 B2
(45) Date of Patent: Apr. 7, 2020

(54) DIAGNOSTIC FAULT DETECTION USING MULTIVARIATE STATISTICAL PATTERN LIBRARY

(71) Applicant: INTERNATIONAL BUSINESS MACHINES CORPORATION, Armonk, NY (US)

(72) Inventors: Tsuyoshi Ide, Harrison, NY (US); Jayant Kalagnanam, Tarrytown, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 354 days.

(21) Appl. No.: 15/284,246

(22) Filed: Oct. 3, 2016

(65) Prior Publication Data

US 2018/0095004 A1    Apr. 5, 2018

(51) Int. Cl.
  *G01M 13/00* (2019.01)
  *G06N 7/00* (2006.01)

(52) U.S. Cl.
  CPC ............ *G01M 13/00* (2013.01); *G06N 7/005* (2013.01)

(58) Field of Classification Search
  CPC .......... G01M 13/00; G06N 99/00; G06N 7/00
  See application file for complete search history.

(56) References Cited

U.S. PATENT DOCUMENTS

| | | | |
|---|---|---|---|
| 8,504,876 B2 | 8/2013 | Mork et al. | |
| 8,738,652 B2 | 5/2014 | Kramer | |
| 9,075,713 B2 | 7/2015 | Jones et al. | |
| 9,349,103 B2 | 5/2016 | Eberhardt, III et al. | |
| 2012/0316835 A1 | 12/2012 | Maeda et al. | |
| 2016/0062950 A1 | 3/2016 | Brodersen et al. | |
| 2016/0103838 A1 | 4/2016 | Sainani et al. | |

OTHER PUBLICATIONS

Paul, Utpal., "Learning Probabilistic Models of Cellular Network Traffic with Applications to Resource Management", 2014 IEEE International Symposium on Dynamic Spectrum Access Networks (DYSPAN).*

(Continued)

*Primary Examiner* — Yoshihisa Ishizuka
(74) *Attorney, Agent, or Firm* — F. Chau & Associates, LLC

(57) ABSTRACT

A method for detecting early indications of equipment failure in an industrial system includes receiving sensor training data collected from industrial equipment under normal conditions and identifying periods of time in the sensor training data when the equipment was functioning normally; finding a pattern for each identified period of time to initialize a plurality of mixture models; learning weighting factors, mean and variance of each of the plurality of mixture models, and removing unimportant models from the plurality of mixture models; determining a Gaussian Markov random field model from surviving mixture models by calculating gating functions for each of the variables and individual mixture models; determining a threshold value of an anomaly score for each variable from the sensor training data; and deploying the model to monitor sensor data from industrial equipment using the threshold values to detect anomalous sensor data values indicative of an impending system failure.

16 Claims, 7 Drawing Sheets

(56) References Cited

OTHER PUBLICATIONS

Rue, Havard., "Gaussian Markov Random Fields: Theory and Applications", Department of Mathematical Sciences NTNU, Norway, Sep. 26, 2008.*

Tsuyosi-Ide, et al., "Proximity-Based Anomaly Detection Using Sparse Structure Learning," Proceedings of the 2009 SIAM International Conference on Data Mining (SDM 09), pp. 97-108.

Susan M. Schweizer, et al., "Hyperspectral Imagery: Clutter Adaptation in Anomaly Detection," IEEE Transactions on Information Theory, vol. 48, No. 5, Aug. 2000, pp. 1855-1871.

Sathish Natarajan, et al., "Multi-Model Based Process Condition Monitoring of Offshore Oil and Gas Production Process," Chemical Engineering Research and Design 88 (2010) pp. 572-591.

Adrian Carduneanu, et al., "Variational Bayesian Model Selection for Mixture Distrubutions," Artificial Intelligence and Statistics 2001, T. Jaakkola and T. Richardson (Eds), pp. 27-34, Morgan Kaufmann.

* cited by examiner

Algorithm 1 The sGMRFmix algorithm

Input: $\mathcal{D}, \rho, \alpha$.
Output: $\{\mu^k, \Lambda^k\}, \{\bar{\theta}_k^i\}$.

$\{\pi_k, \mu^k, \Lambda^k\} = \text{sparseGaussMix}(\mathcal{D}, \rho)$.
$\{\bar{\theta}_k^i\} = \text{GMRFmix}(\{\pi_k, \mu^k, \Lambda^k\}, \alpha)$.

FIG. 4

Algorithm 2 sparseGaussMix procedure SPARSEGAUSSMIX($\mathcal{D}, \rho$)
    Initialize $(m^k, \Lambda^k)$ for $k = 1, \ldots, K$.
    Initialize $\pi_k = 1/K$
    repeat
        for $n \leftarrow 1, N$ do
            for $k \leftarrow 1, K$ do
                $r_k^{(n)} \leftarrow \pi_k \mathcal{N}(x^{(n)}|m^k, (\Lambda^k)^{-1})$
            end for
            $r_k^{(n)} \leftarrow r_k^{(n)} / \sum_{l=1}^{K} r_l^{(n)}$
        end for
        for $k \leftarrow 1, K$ do
            $N^k \leftarrow \sum_{n=1}^{N} r_k^{(n)}$
            $\pi_k \leftarrow N^k / N$.
            $\mu^k \leftarrow \sum_{n=1}^{N} r_k^{(n)} x^{(n)} / N^k$.
            Find $\Lambda^k$ by solving Eq. (39).
        end for
    until convergence
    return $\{\pi_k, \mu^k, \Lambda^k\}$ for $k = 1, \ldots, K$.
end procedure

FIG. 5

Algorithm 3 GMRFmix procedure GMRFMIX($\{\pi_k, \mu^k, \Lambda^k\}, \alpha$)
    Initialize $N_k^i = N\pi_k$ for all $i$ and $k$.
    for $i \leftarrow 1, M$ do
      repeat
        for $k \leftarrow 1, K$ do
          $a_k^i \leftarrow \alpha_k + N_k^i$
          $\bar{\theta}_k^i \leftarrow \exp\{\psi(a_k^i) - \psi(\bar{a}^i)\}$
          for $n \leftarrow 1, N$ do
            $g_k^{i(n)} \leftarrow \bar{\theta}_k^i \mathcal{N}(x_i^{(n)} | \mu_i^k, w_i^k)$
          end for
        end for
        $g_k^{i(n)} \leftarrow g_k^{i(n)} / \sum_{l=1}^{K} g_l^{i(n)}$ for all $n, k$.
        $N_k^i \leftarrow \sum_{n=1}^{N} g_k^{i(n)}$ for all $k$.
      end for
    until convergence
  return $\bar{\theta}_k^i$ for $i = 1, \ldots, M$ and $k = 1, \ldots, K$.
  end procedure

FIG. 6

DIAGNOSTIC FAULT DETECTION USING MULTIVARIATE STATISTICAL PATTERN LIBRARY

BACKGROUND

Technical Field

Embodiments of the present disclosure are directed to the monitoring of industrial assets based on physical sensor data to detect precursor events of major system failures.

Discussion of the Related Art

Anomaly detection from sensor data is an important application of data mining. Using off-shore oil production as an example, to ensure safety of workers and prevent major system failures, remote monitoring of equipment is a critical part of offshore oil production. A key task of remote monitoring is anomaly detection, i.e., to detect early indications of failures before their occurrence. For example, compressors are a key component to ensure stable production, and for this reason are monitored.

Much effort has been devoted to automate anomaly detection, but it is still a very challenging task. There are several technical challenges. Sensor data, such as temperature, pressure, displacement, flow rate, vibration, etc., is noisy, sensor values may change discontinuously, and the correlational structure can change even on a daily basis. There is a need to incorporate an intelligent method to automatically remove unwanted noise. Variable dependency matters, in that variables should not be analyzed separately, as this may generate false alerts. In addition, the system being monitored is frequently unstable, as operating conditions change over time. There is also a need for diagnostic information such as which variables exhibit anomalies. However, prior art methods, such as k-means and principle component analysis (PCA), are known to have serious issues in practice, and cannot both handling multiple operating modes and multivariate variable-wise anomaly scoring. Most notably, PCA cannot effectively provide variable-wise information. This is problematic in most industrial applications, where dimensionality is often greater than 100.

SUMMARY

Exemplary embodiments of the present disclosure provide a system for building a normal pattern library by which a control operator can judge if the current operation is good or bad.

According to an embodiment of the disclosure, there is provided a method for detecting early indications of equipment failure in an industrial system, including receiving sensor training data collected from industrial equipment under normal conditions and identifying periods of time in the sensor training data when the equipment was functioning normally, where the sensor training data includes samples of sensor values for a plurality of variables, finding a pattern for each identified period of time using a pattern detection algorithm to initialize a plurality of mixture models, where each mixture model is a function of the plurality of variables, learning weighting factors, mean and variance of each of the plurality of mixture models, and removing unimportant models from the plurality of mixture models, determining a Gaussian Markov random field (GMRF) model from surviving mixture models by calculating gating functions for each of the variables and individual mixture models, determining a threshold value of an anomaly score for each variable from the sensor training data, and deploying the GMRF model to monitor sensor data from industrial equipment using the threshold values to detect anomalous sensor data values that could be indicative of an impending system failure.

According to a further embodiment of the disclosure, sensor training data for the identified periods of time, the initial plurality of mixture models, and means and precisions of surviving mixtures models are stored in a database.

According to a further embodiment of the disclosure, learning weighting factors, mean and variance of each of the plurality of mixture models comprises a maximum a posteriori estimation of a precision matrix for each model combined with a variational Bayes method.

According to a further embodiment of the disclosure, learning weighting factors, mean and variance of each of the plurality of mixture models includes initializing a mean, a covariance matrix, and a mixture weight for each of the plurality of mixture models, initializing a responsibility $r_k^{(n)}$ for each sample n of the sensor training data and each mixture k as a weighted product of the mixture weight for each mixture model and a normal probability distribution of each sample of the sensor training data for each mixture, calculating, for each mixture k, a mixture fraction $N^k \leftarrow \sum_{n=1}^{N} r_k^{(n)}$, a mixture weight $$\pi_k \leftarrow \frac{N^k}{N},$$

a mean $$\mu^k \leftarrow \frac{1}{N^k} \sum_{n=1}^{N} r_k^{(n)} x^{(n)}$$

where $x^{(n)}$ is an n-th sample value, and a precision matrix $$\Lambda^k \leftarrow \mathrm{argmax}_{\Lambda^k} \left\{ \ln|\Lambda^k| - Tr\left(\Lambda^k \sum^k\right) - \frac{\rho}{N^k} \|\Lambda^k\|_1 \right\} \text{ where}$$

$$\sum^k \leftarrow \frac{1}{N^k} \sum_{n=1}^{N} r_k^{(n)} (x^{(n)} - \mu^k)(x^{(n)} - \mu^k)^T$$

and $\rho$ is an input constant, where the calculations of the mixture weight, mean, and precision matrix are repeated until the values converge.

According to a further embodiment of the disclosure, initializing the mean and covariance matrix for each of the plurality of mixture models comprises training a single Gaussian model for sensor training data in each identified period of time.

According to a further embodiment of the disclosure, calculating gating functions for each of the variables and individual mixture models includes initializing $N_k^i$ as a number of samples of the i-th variable in the k-th mixture model, and a hyperparameter $\alpha_k$ for each mixture $$k \text{ as } \alpha_k = \begin{cases} 0 & \text{for } \pi_k = 0, \\ 1 & \text{otherwise,} \end{cases}$$

where $\pi_k$ is a mixture weight for each mixture k, calculating, for each mixture k, a first parameter $\alpha_k^i \leftarrow \alpha_k + N_k^i$, a second parameter $\bar{\theta}_k^i \leftarrow \exp\{\psi(\alpha_k^i) - \psi(\bar{\alpha}^i)\}$ where $\bar{\alpha}^i = \sum_{k=1}^{K} \alpha_k^i$ where K is a number of models and $\psi(\ )$ is digamma function, a gating function $$g_k^{(n)} \leftarrow \frac{\bar{\theta}_k^i N(x_i^{(n)} | u_i^k, w_i^k)}{\sum_{l=1}^{K} \bar{\theta}_l^i N(x_i^{(n)} | u_i^l, w_i^l)}$$

for all samples n where $N(x_i^{(n)}|u_i^k,w_i^k)$ is a normal probability distribution of each sample $x_i^{(n)}$ of the sensor training data for each mixture with mean $u_i^k$ and variance $w_i^k$, and the number of samples of the i-th variable $N_i^k \leftarrow \sum_{n=1}^{N} g_k^{i(n)}$, where the calculations of the first parameter, the second parameter, gating function, and the number of samples of the i-th variable are repeated until the values convergence.

According to a further embodiment of the disclosure, the anomaly score for each variable i is $a_i(x) = a_i(x) = -\ln p(x_i|x_1, \ldots, x_{i-1}, x_{i+1}, \ldots, x_M) \approx -\ln \sum_{k=1}^{K} g_k^i(x) N(x_i|u_i^k, w_i^k)$, where $p(x_i|x_1, \ldots, x_{i-1}, x_{i+1}, \ldots, x_M)$ is a conditional probability density function for the i-th variable $x_i$ given the remaining variables $x_1, \ldots, x_{i-1}, x_{i+1}, \ldots, x_M$, $g_k^i(x)$ is the gating function for the i-th variable and the k-th model, and $N(x_i|u_i^k,w_i^k)$ is a normal probability distribution of sample $x_i$ of the sensor training data for each mixture with mean $u_i^k$ and variance $w_i^k$.

According to a further embodiment of the disclosure, determining a threshold value of an anomaly score for each variable comprises receiving a new set of sensor data samples comprising pairs of x and a label indicative of whether each variable sample is anomalous or not, and selecting a best pair of a threshold and a scale parameter ρ of a prior distribution of the variance of the new set of sensor data samples.

According to another embodiment of the disclosure, there is provided a non-transitory program storage device readable by a computer, tangibly embodying a program of instructions executed by the computer to perform the method steps for detecting early indications of equipment failure in an industrial system.

BRIEF DESCRIPTION OF THE DRAWINGS

FIG. 4 shows an algorithm for an anomaly detection based on a GMRF mixture, according to an embodiment of the disclosure.

FIG. 5 shows another algorithm that identifies major dependency patterns in the data and removes unwanted noise from the dependency structure, according to an embodiment of the disclosure.

FIG. 6 shows another algorithm that, given identified patterns, determines a gating function for an arbitrary input sample, according to an embodiment of the disclosure.

DETAILED DESCRIPTION OF EXEMPLARY EMBODIMENTS

Figure 1:
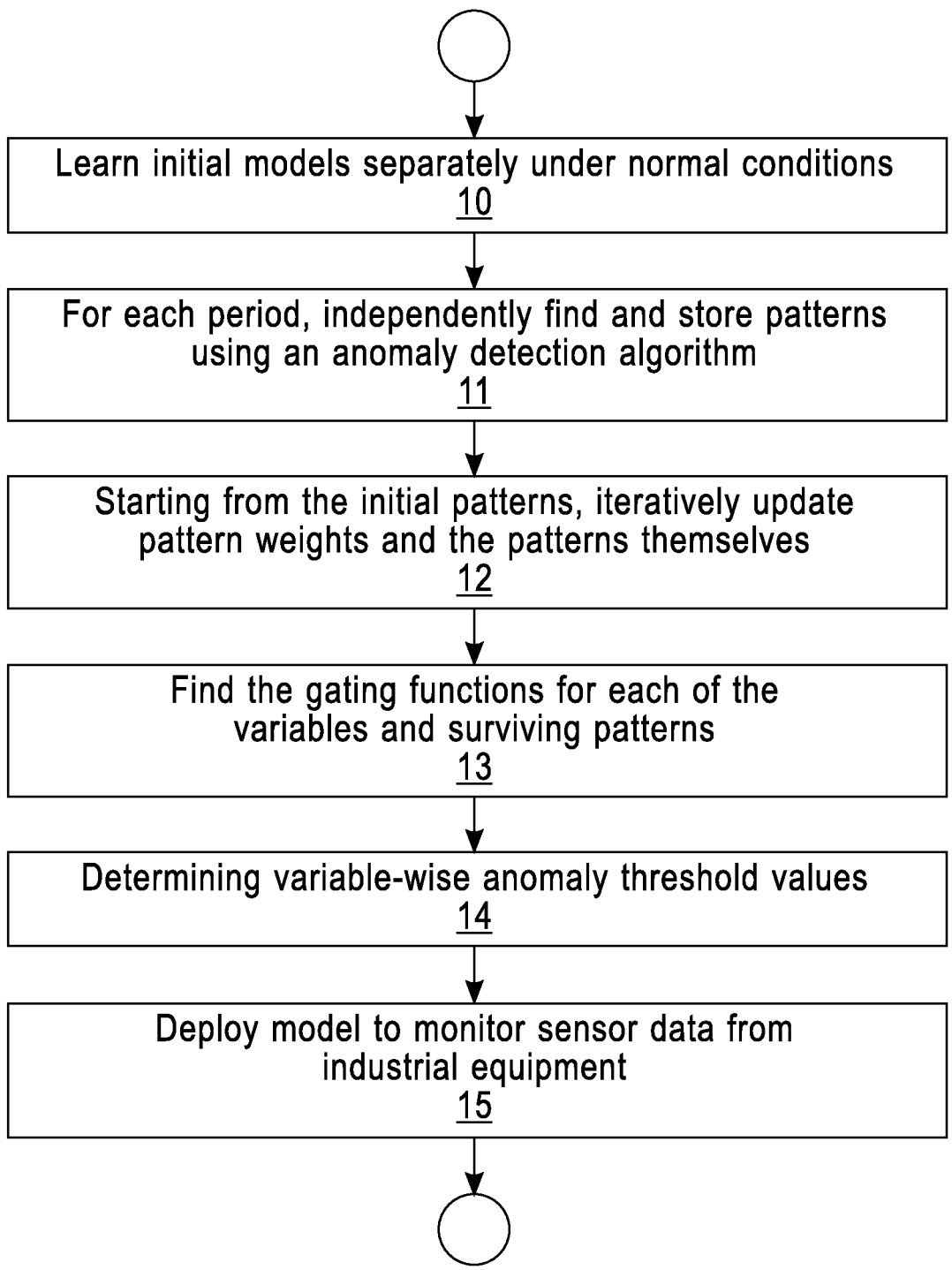
FIG. 1 is a flowchart of a procedure that can automatically learn a model from training data, according to an embodiment of the disclosure.

Exemplary embodiments of the disclosure as described herein generally include systems for monitoring industrial assets based on physical sensor data. Embodiments may be described, and illustrated in the drawings, in terms of functional blocks, units or steps. Those skilled in the art will understand that these blocks, units or steps can be physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units or steps being implemented by microprocessors or similar circuits, they may be programmed using software, such as microcode, to perform various functions discussed herein and may optionally be driven by firmware and/or software. Alternatively, each block, unit or step may be implemented by dedicated hardware, or as a combination of dedicated hardware to perform some functions and a processor, such as one or more programmed microprocessors and associated circuitry, to perform other functions. Also, each block, unit or step of the embodiments may be physically separated into two or more interacting and discrete blocks, units or steps without departing from the scope of the disclosure. Further, the blocks, units or steps of the embodiments may be physically combined into more complex blocks, units or steps without departing from the scope of the disclose. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Embodiments of the present disclosure are directed to the monitoring of industrial assets based on physical sensor data to detect precursor events of major system failures, where the number of sensors may be greater than 100, and the sensors are sampled at predetermined time intervals. An exemplary, non-limiting time interval is 10 seconds. Exemplary embodiments of the present disclosure provide a system for building a normal pattern library by which a control operator can judge if the current operation is good or bad. Since values of sensor observations are not deterministic but stochastic, a pattern according to an embodiment can be described as a probability distribution that allows computing anomaly scores as a function of an observation x. Based on the technical challenges previously summarized, the pattern library may contain multiple patterns, each of the patterns captures dependencies between variables (sensors), each pattern should be robust to unpredictable external disturbances, and patterns should allow computing variable-wise anomaly scores. Practically feasible methods to find patterns satisfying these requirements are not currently known. Embodiments of the disclosure provide a process that converts training data into such patterns.

According to an embodiment of the disclosure, each pattern can be described as a probabilistic model known as the "Gaussian Markov random field (GMRF)" that allows computing an anomaly score of each variable. A GMRF for the i-th variable can be characterized by (1) the list of "neighbors", (2) their weights, and (3) the variance, as a function of the other variables. Using these, the GRMF can be used to compute the anomaly score for, e.g., the i-th variable upon receiving an observation by comparing the value of the i-th measurement and a value expected by the neighbors. Systems according to embodiments of the disclosure can learn multiple GMRFs and combine them into a single pattern, which is equivalent to a conditional probability density function.

According to an embodiment of the disclosure, anomaly detection is based on a sparse mixture of sparse Gaussian Markov random fields (GMRFs), in which GMRFs are exploited to define variable-wise anomaly scores. The general form of a GMRF for a random variable $x_i$ is $$x_i = \mu_i + \Sigma_{i=1, i \neq 1}^{M} c_{i,l}(x_l - \mu_l) + \text{(Gaussian noise)}. \quad (1)$$

According to an embodiment of the disclosure, a variable-wise anomaly score can be defined as $$a_i(x) = -\ln p(x_i | x_1, \ldots, x_{i-1}, x_{i+1}, \ldots, x_M), \quad (2)$$

where $p(x_i | x_1, \ldots, x_{i-1}, x_{i+1}, \ldots, x_M)$ is a conditional probability density function for the i-th variable x, given the remaining variables $x_1, \ldots, x_{i-1}, x_{i+1}, \ldots, x_M$. According to an embodiment of the disclosure, the variable-wise anomaly score can be extended to mixtures by defining the conditional probability as $$p(x_i | x_1, \ldots, x_{i-1}, x_{i+1}, \ldots, x_M) = \Sigma_{k=1}^{K} g_k^i(x) N(x_i | u_i^k, w_i^k), \quad (3)$$

where $N(|\mu^k, w^k)$ is the Gaussian distribution with $\mu^k$ as the mean and $w^k$ as the variance, and $g_k^i(x)$ is a gating function that is learned from the data. The mean $u_i^k$ and the variance $w_i^k$ in EQ. (3) can be given by $$u_i^k = \mu_i^k - \frac{1}{\Lambda_{i,i}^k} \sum_{l \neq i}^{M} \Lambda_{i,l}^k (x_l - \mu_l^k), \quad (4)$$

$$w_i^k = \frac{1}{\Lambda_{i,i}^k}. \quad (5)$$

where z,29 $^k$ is the precision matrix for the component k. Embodiments of the disclosure can provide a solution to finding the gating function $g_k^i(x)$ and can learn $\mu_i^k, w_i^k$ while maintaining sparsity over the mixture components and sparsity in the variables dependencies.

A process according to an embodiment of the disclosure can derive approximate but optimal conditional distributions from a mixture model. A procedure according to an embodiment of the disclosure that can automatically learn a model from training data is described as follows, with reference to the flowchart of FIG. 1. Referring now to the figure, a process begins by learning initial models separately from sensor training data collected under normal conditions at step 10 by identifying periods of time in the data when a system was working normally, and storing the sensor data of those days in a database. Let K denote the number of periods. Then, at step 11, for each period, independently find a pattern using a pattern detection algorithm, and store those patterns in the database. An exemplary, non-limiting pattern detection algorithm is disclosed in T. Id'e, et al., "Proximity-based anomaly detection using sparse structure learning", in Proc. of 2009 SIAM International Conference on Data Mining (SDM 09), pp. 97-108, the contents of which are herein incorporated by reference in their entirety, and which is summarized as follows.

The "correlation anomaly" score of each variable in a noisy test data sample is computed by comparing the test data with reference data, even when some of the variables are highly correlated. Spurious dependencies introduced by noise are removed by focusing on the most significant dependencies for each variable. Neighborhood selection is performed in an adaptive manner by fitting a sparse graphical Gaussian model as the maximum likelihood estimation of the precision matrix under an $L_1$ penalty. The anomaly score for each variable is computed by evaluating the distances between the fitted conditional distributions within the Markov blanket for that variable, for the (two) data sets to be compared.

A procedure according to an embodiment of the disclosure then iteratively learns both weighting factors and individual model parameters of the models, and removes unimportant models from the mixture. Returning to FIG. 1, starting from those initial patterns, pattern weights and the patterns themselves are iteratively updated at step 12. An iterative process according to an embodiment of the disclosure is based on a novel combination of a MAP (maximum a posteriori) estimation of the precision matrix and the variational Bayes method. A MAP solution is characterized as "$L_1$-regularized graphical Gaussian model", is guaranteed to reach a maximal point under the assumption that the posterior distribution takes a factorized form as in EQS. (10)-(11), below, and features a mechanism that achieves sparsity over the patterns and a mechanism that achieves sparsity in the dependencies between variables. A combination of a MAP estimation of the precision matrix and the variational Bayes method according to an embodiment of the disclosure is described in detail below. Upon convergence, the means and precision matrices of the surviving models (K'<K) are stored in the database.

Based on the surviving learned mixture models, a procedure according to an embodiment of the disclosure derives the Gaussian Markov random field model described above. According to an embodiment, another iteration starts at step 13 to find the gating functions for each of the variables and the learned patterns, resulting in K'×M gating functions, where M is the number of variables. The iterative process according to an embodiment for finding the gating functions is based on a novel combination of a GMRF and the variational Bayes method, which is guaranteed to reach a maximal point under the assumption that the posterior distribution takes a factorized form as in EQS. (23)-(25), below, is described in detail below.

According to embodiments of the disclosure, once a model is built, variable-wise anomaly threshold values can be determined at step 14 based on the training data. According to an embodiment, one possible procedure sets a threshold as twice the maximum of the anomaly score of each variable, computed based on the training data. Another possible procedure according to an embodiment fits a probability distribution, such as Gaussian or a gamma distribution, to each variable, and sets a percentile such as 1%. At step 15, a model according to an embodiment is deployed to monitor sensor data from industrial equipment using the variable-wise threshold values to detect anomalous sensor values that could be indicative of an impending system failure.

Figure 2:
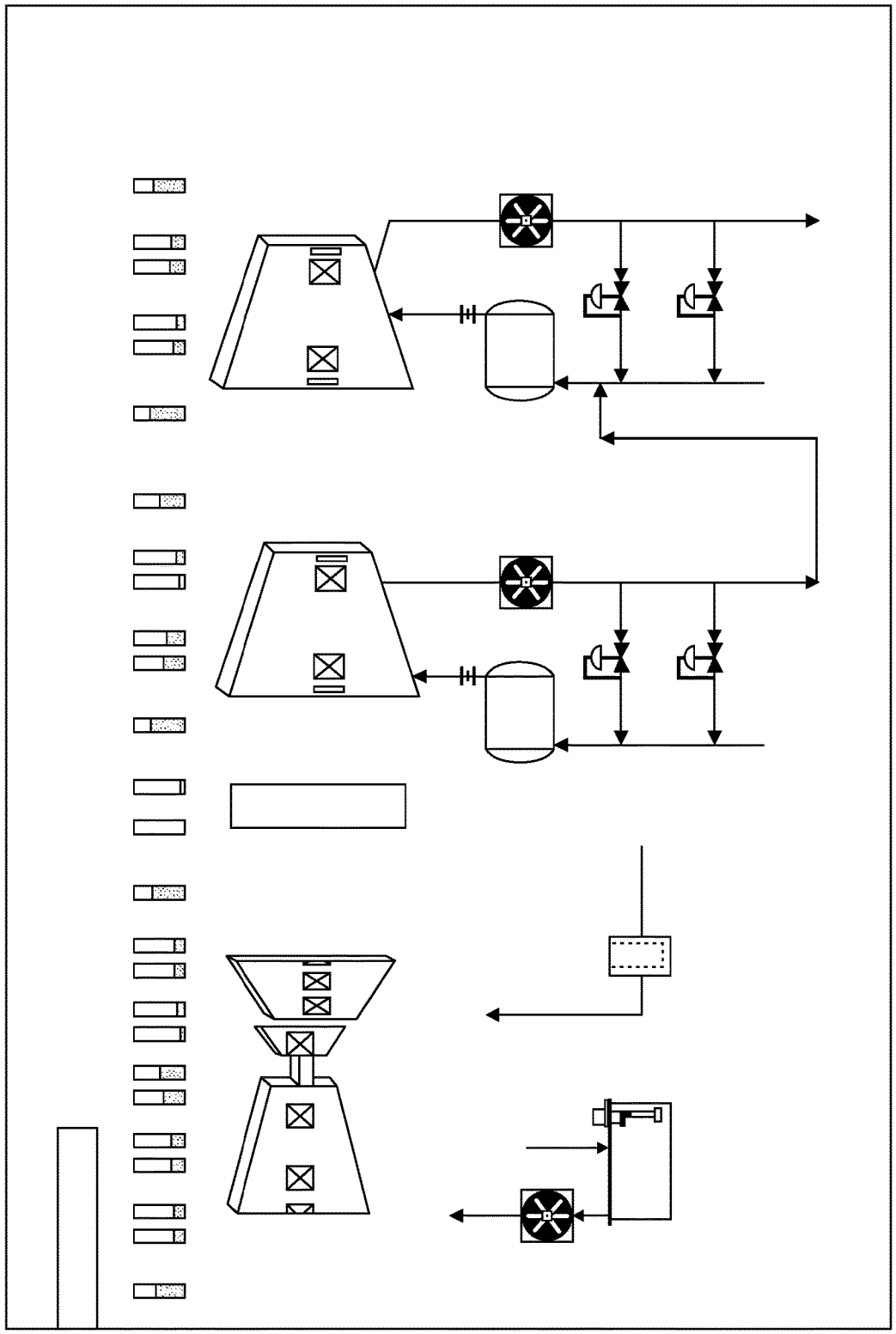
FIG. 2 depicts a control panel for monitoring variable-wise anomaly scores, according to an embodiment of the disclosure.
Figure 3:
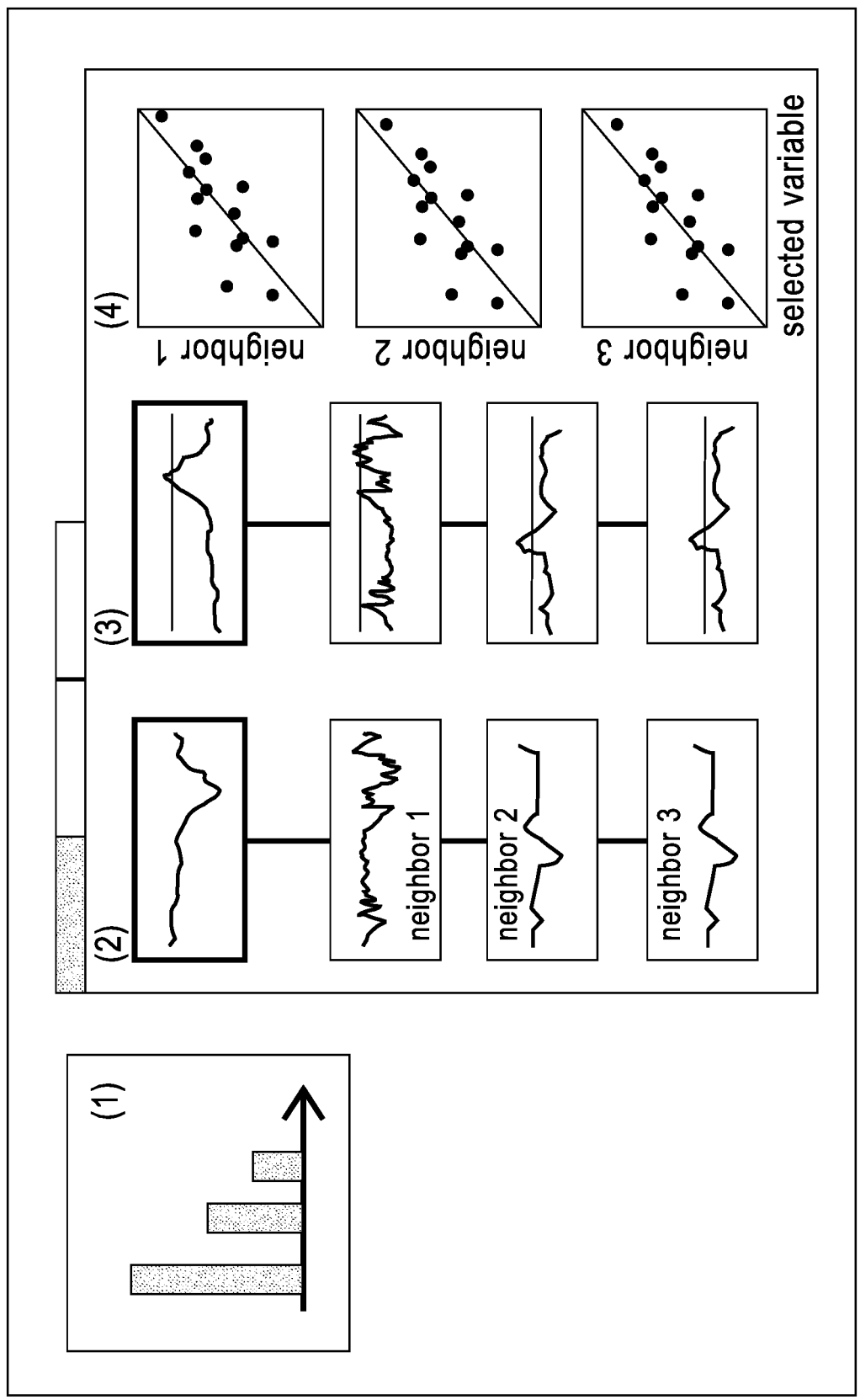
FIG. 3 depicts another panel that shows details of a selected variable and its neighbors, according to an embodiment of the disclosure.

Embodiments of the disclosure can be implemented with a graphical user interface (GUI). A control panel such as that shown in FIG. 2 monitors variable-wise anomaly scores, possibly represented by histograms. When a variable go beyond its threshold values, it starts blinking on the display. A control operator can then click on the variable's name to see if it really is indicating a failure. Another panel, such as that shown in FIG. 3, pops up to show details of the selected variable and its neighbors. Referring to FIG. 3, these details may include a histogram 31 showing model weights, averaged over recent data recent trends 32 of raw data, recent trends 33 of anomaly scores, and a pairwise scatter plot 34 in the recent window.

Results based on real compressor data collected over a plurality of months indicate that algorithms according to embodiments of the disclosure can identify patterns and remove false signals based on the identified patterns.

Learning Sparse Mixture of Sparse Graphical Models

To capture multiple operational mode of the system, embodiments of the disclosure assume a Gaussian mixture model for the generative process of x. To ensure the capability of removing nuisance noisy variables, the model should be sparse. This section explains to learn sparse mixture of sparse graphical Gaussian models.

In the following, vectors are represented by the boldface letters such as x. Matrices are represented by sans serif fonts such as $\Lambda$. Components of vectors and matrices are represented by normal roman letters with subscripts such as $x_i$ and $\Lambda_{i,j}$. Upper scripts are mainly used to distinguish mixture components. Sample indexes are represented by upper scripts with a parenthesis, e.g. $x_i^{(n)}$. The transpose of vectors and matrices is denoted by $^T$. The $l_1$ norm $\|\cdot\|_1$ for matrices is defined as e.g. $\|\Lambda\|_1 = \Sigma_{i,j} |\Lambda_{i,j}|$.

According to embodiments, a training data set $D = \{x^{(t)} \in R^M | t=1, \ldots, N\}$ is provided, where N is the number of observations and M is the dimensionality of the samples. For example, in the case of oil production compressors, M variables may be displacements, acceleration, temperature, pressure, and flow rate. The training data D is assumed to be collected under normal conditions of the system. As discussed below, D may consist of several disjoint subsets $D = \{D^j | j=1, \ldots, K\}$ collected over different time periods. Due to dynamic changes in the operational condition, Dj's may have different patterns.

According to embodiments of the disclosure, a Bayesian Gaussian mixture model having K mixture components is used. First, an observation model according to an embodiment is defined by $$p(x|z, \mu, \Lambda) = \prod_{k=1}^{K} N(x | \mu^k, (\Lambda^k)^{-1})^{z_k} \quad (6)$$

where $\mu$ and $\Lambda$ are collective notations representing $\{\mu^k\}$ and $\{\Lambda^k\}$, respectively, z is the indicator variable of cluster assignment where $z_k \in \{0, 1\}$ for all k, and $\Sigma_{k=1}^K z_k = 1$, and where a cluster refers to a pattern for an identified period of time.

According to embodiments, prior distributions for $\Lambda^k$ and z are given by $$p(\Lambda^k | \rho) = \left(\frac{\rho}{4}\right)^{M^2} \exp\left(-\frac{\rho}{2} \|\Lambda^k\|_1\right), \quad (7)$$

$$p(z|\pi) = \prod_{k=1}^{K} \pi_k^{z_k}, \quad (8)$$

where $\rho$ is an input parameter treated as a given constant whose initialization will be described below, and $\pi$ will be determined as a part of a model according to an embodiment.

From these equations, the complete likelihood according to embodiments can be written as $$P(D, Z, \Lambda | \mu, \pi, \rho) = \Pi_{k=1}^{K} p(\Lambda^k | \rho) \times \Pi_{n=1}^{N} p(z^{(n)} | \pi) p(x^{(n)} | z^{(n)}, \mu, \Lambda), \quad (9)$$

where Z is a collective notation for $\{z_k^{(n)}\}$.

According to embodiments, the variational Bayes (VB) method combined with point estimation for the mixture weight $\pi$ is used. The posteriors of Z and $\Lambda$ can be assumed to be in the following form:

$$q(Z) = \prod_{n=1}^{N} \prod_{k=1}^{K} (r_k^{(n)})^{z_k^{(n)}}, \quad (10)$$

$$q(\Lambda) = \prod_{k=1}^{k} \delta(\Lambda^k - \overline{\Lambda}^k), \quad (11)$$

where $\delta()$ is the Dirac delta function and $r_k^{(n)}$ is a responsibility, an intermediate variable defined below. This means that the MAP (maximum a posteriori) estimator can be used for $\Lambda$. Combining with the point estimation equation for $\mu$ and $\pi$ yields the following simultaneous equations:

$$\ln q(Z) = c. + \langle \ln P(D, Z, \Lambda | \pi, \mu, \rho) \rangle_\Lambda, \quad (12)$$

$$\pi = \arg\max{}_\pi \langle \ln P(D, Z, \Lambda | \pi, \mu, \rho) \rangle_{\Lambda, Z}, \quad (13)$$

$$\mu = \arg\max{}_\mu \langle \ln P(D, Z, \Lambda | \pi, \mu, \rho) \rangle_{\Lambda, Z}, \quad (14)$$

$$\overline{\Lambda} = \arg\max \langle \Lambda \ln P(D, Z, \Lambda | \pi, \mu, \rho) \rangle_z, \quad (15)$$

subject to $\Sigma_{k=1}^{K} \pi_k = 1$. It can be shown that EQ. (13) leads to a sparse solution with respect to $\pi$.

According to embodiments, EQ. (12) can be solved by collecting terms depending on $z^{(n)}$, $\Lambda$ and finding a normalization factor. Assuming that $\mu$, $\Lambda$, and $\pi$ are given as numerical values, the responsibility $\{r_k^{(n)}\}$ is computed as $$r_k^{(n)} \leftarrow \pi_k N(x^{(n)} | \mu^k, (\overline{\Lambda}^k)^{-1}), \quad (16)$$

$$r_k^{(n)} \leftarrow \frac{r_k^{(n)}}{\sum_{l=1}^{k} r_l^{(n)}}. \quad (17)$$

EQS. (13)-(15) can be solved as follows:

$$N^k \leftarrow \sum_{n=1}^{N} r_k^{(n)}, \pi_k \leftarrow \frac{N^k}{N}, \quad (18)$$

$$\mu^k \leftarrow \frac{1}{N^k} \sum_{n=1}^{N} r_k^{(n)} x^{(n)}, \quad (19)$$

$$\sum{}^k \leftarrow \frac{1}{N^k} \sum_{n=1}^{N} r_k^{(n)} (x^{(n)} - \mu^k)(x^{(n)} - \mu^k)^T, \quad (20)$$

$$\overline{\Lambda}^k \leftarrow \arg\max{}_{\Lambda^k} \left\{ \ln |\Lambda^k| - Tr\left(\Lambda^k \sum{}^k\right) - \frac{\rho}{N^k} \|\Lambda^k\|_1 \right\}, \quad (21)$$

EQS. (16)-(17) and (18)-(21) are computed for $k=1; \ldots, K$ and repeated until convergence.

Notice that EQ. (21) preserves the original formulation of the $l_1$-regularized structure learning for graphical Gaussian model. As compared to the single component case, no extra effort is needed to solve the optimization problem itself, and the resulting precision matrix remains sparse, depending on the value of $\rho/N^k$. It can be seen that the fewer samples a cluster has, the more the $l_1$ regularization weight is applied.

Properties of Sparse GMRF Mixtures

Embodiments of the disclosure provide an anomaly detection approach based on the GMRF mixture. As summarized in Algorithm 1, shown in FIG. 4, an algorithm according to an embodiment, sGMRFmix, includes two stages. A first stage, sparseGaussMix as summarized in Algorithm 2, shown in FIG. 5, starts with a large enough number of K, and identifies major dependency patterns from the data. A sufficient number (less than K) patterns can be identified, and unwanted noise can be removed from the dependency structure. Given the identified patterns $\{(\mu^k, \wedge^k)\}$, the second stage, GMRFmix as summarized in Algorithm 3, shown in FIG. 6. determines the gating function $g_k^i(x)$ for an arbitrary input sample x through the resulting $\theta_k^i$'s. In Algorithm 3, the value of the gating function $g_k^{i(n)}$ varies depending on x. To compute an anomaly score (outlier score), a gating function according to an embodiment needs to be computed for an unseen sample. According to embodiments, $g_k^{i(n)}$ is computed from $\theta_k^i$ on the fly.

The complexity of a sGMRFmix algorithm according to an embodiment is $O(K(N+M^3))$. A potential bottleneck is the step to find the graphical Gaussian model using EQ. (39), which is $O(M^3)$. In condition-based monitoring of industrial equipment, which is a major application of sGMRFmix, M<<N and M is typically on the order of 100. Thus, in practice, the iterative execution of EQ. (39) is not a big issue in total.

A sGMRFmix algorithm according to embodiments uses two types of input parameters: α and ρ. An approach according to an embodiment for choosing α is $$\alpha_k = \begin{cases} 0 & \text{for } \pi_k = 0, \\ 1 & \text{otherwise,} \end{cases} \quad (22)$$

where $\{\pi_k\}$ is the component weight calculated by SparseGaussMix. With an initialization rule of $N_k=N\pi_k$, EQS. (16)-(19) always give for $\alpha_k^i=\overline{\theta}_k^i=0$ the k's of $\pi_k=0$, preserving the sparsity over different k's.

On the other hand, in the context of anomaly detection, ρ can be determined together with the threshold on the anomaly score to maximize the performance of anomaly detection. With a threshold, the anomaly score $a^i(x)$ is transformed into a binary decision function. Given another data set $D_{test}$ comprising pairs of x and a label telling if each of the variables of the sample is anomalous (+1) or not (−1), the best pair of threshold and ρ can be selected. One useful measure is the F-score between normal and anomalous sample accuracies.

To use an F-score, training and testing data need to be prepared. The testing data should include a good/bad label associated with the data items. In addition, a set of (threshold, ρ) pairs to be evaluated needs to be prepared. For one (threshold, ρ) pair, train a model using the training data, and evaluate the accuracies separately for good and bad samples, respectively, and compute the F-measure as the harmonic average between the two accuracies. For each (threshold, ρ) pair, repeat and record the F-measure, and select the (threshold, ρ) pair that gives the highest F score.

Another important decision point according to an embodiment is how to initialize $\{(\mu^k, \wedge^k)\}$ in sparseGaussMix. In the context of industrial condition-based monitoring, this can be naturally done by using subsets of the data. D may consist of K disjoint subsets as $\{D^1; \ldots, D^K\}$, and each of the $D^1$'s may correspond a different time period. For example, $D^1$ may be a data set taken in January 2014, and $D^4$ may be in August 2015. The initial parameters can be found by training a single graphical Gaussian model for the each using. In this way, embodiments of the disclosure can handle dynamic changes of operational conditions. Also, this approach leads to natural interpretability of the resulting model. Surviving k's with nonzero $\pi_k$ represent distinctive operational patterns. Knowing where the k's come from provides additional insights on a system being measured.

Gaussian Markov Random Field Mixtures

According to embodiments, consider how to find the gating function in EQ. (4) now that $\{(\mu^k, \wedge^k)\}$ are given. Let $h^i$ denote a cluster assignment indicator for the i-th variable, and consider the following model:

$$p(x_i \mid x_{-i}, h^i) = \prod_{k=1}^{K} N(x_i \mid u_i^k, w_i^k)^{h_k^i}, \quad (23)$$

$$p(h^i \mid \theta^i) = \prod_{k=1}^{K} (\theta_k^i)^{h_k^i}, \quad (24)$$

$$p(\theta^i \mid \alpha^i) = \frac{\Gamma(\alpha_1^i) \ldots \Gamma(\alpha_K^i)}{\Gamma(\overline{\alpha}_1^i)} \prod_{k=1}^{K} (\theta_k^i)^{\alpha_k^i - 1}, \quad (25)$$

where Γ( ) is the gamma function, $$\overline{\alpha} = \sum_{k=1}^{K} \alpha_k^i$$

with $\alpha_k^i$ being a hyper parameter treated as a given constant, and $h_k^i \in \{0,1\}$ and $$\sum_{k=1}^{K} h_k^i,$$

and $x_{-i}$ is defined by $x_1, \ldots, x_{i-1}, x_{i+1}, \ldots, x_M$.

Based on a model according to an embodiment, the log complete likelihood is written as $$\ln P(D, H^i \mid \theta^i) = \sum_{n=1}^{N} \sum_{k=1}^{K} h_k^{i(n)} \ln\{\theta_k^i N(x_i^{(n)} \mid u_i^k, w_i^k)\} - \\ \ln \Gamma(\overline{\alpha}) + \sum_{k=1}^{K} \{\ln \Gamma(\alpha_k) + (\alpha_k - 1) \ln \theta_k^i\} \quad (26)$$

where $h^{i(n)}$ is the indicator vector for the n-th sample and $H^i$ is a collective notations for $\{h^{i(n)} \mid n=1; \ldots, N\}$.

To infer the model, an embodiment of the disclosure uses the variational Bayes (VB) method. According to embodiments of the disclosure, using the result $(\ln \theta_k^i)_{\theta^i} = \psi(\alpha_k^i) - \psi(\overline{\alpha}^i)$, where ψ( ) is the digamma function, and $$\bar{a}^i = \sum_{k=1}^{K} a_k^i,$$

the VB iterative equations are $$a_k^i \leftarrow \alpha_k + N_k^i, \quad (27)$$

$$\bar{\theta}_k^i \leftarrow \exp\{\psi(a_k^i) - \psi(\bar{a}^i)\}, \quad (28)$$

$$g_k^{i(n)} \leftarrow \frac{\bar{\theta}_k^i N(x_i^{(n)} \mid u_i^k, w_i^k)}{\sum_{l=1}^{K} \bar{\theta}_l^i N(x_i^{(n)} \mid u_i^l, w_i^l)} \text{ for all } n, \quad (29)$$

$$N_i^k \leftarrow \sum_{n=1}^{N} g_k^{i(n)}, \quad (30)$$

where $N_k^i$ is a number of samples of the i-th variable in the k-th model. These substitutions can be performed until convergence. Repeating over i=1; ..., M and k=1; ..., K yields a M×K matrix $\Theta = [\theta_k^i]$.

According to embodiments, a predictive distribution can be formally defined by $$p(x_i|x_{-i},D) = \int dh^i q(h^i) p(x_i|x_{-i},h^i). \quad (31)$$

To find $q(h^i)$, the posterior distribution for the indicator variable associated with a new sample x, consider an augmented data set $D \cup x$. In this case, the log complete likelihood is given by $$\ln P(D, x, H^i, h^i \mid \theta^i) = \ln P(D, H^i \mid \theta^i) + \sum_{k=1}^{K} h_k^i \ln\{\theta_k^i N(x_i \mid u_i^k, w_i^k)\}, \quad (32)$$

Corresponding to this, let a posterior according to an embodiment be $$q(H^i, h^i) = q(H^i) \times \prod_{k=1}^{K} (g_k^i)^{h_k^i}, \quad (33)$$

which yields VB iterative equations similar to EQS. (27)-(30). Although the resulting $\{\theta_k^i\}$ differs from the one obtained using only D, EQ. (30) suggests that the difference is just on the order of 1/N, which is negligible when N>>1. Therefore, according to embodiments, a posterior distribution of a new sample x is given by $$g_k^i(x) \approx \frac{\bar{\theta}_k^i N(x_i \mid u_i^k, w_i^k)}{\sum_{l=1}^{K} \bar{\theta}_l N(x_i \mid u_i^l, w_i^l)}, \quad (34)$$

where $\theta_k^i$ is the solution of EQS (29)-(30) and $$\theta_l = \sum_{i=1}^{M} \theta_l^i.$$

Finally, according to embodiments, using EQS. (3) and (34), a variable-wise anomaly score defined in EQ. (2) is given by $$a_i(x) = -\ln \Sigma_{k=1}^{K} g_k^i(x) N(x_i \mid u_k^i, w_k^i). \quad (35)$$

The right hand side includes the parameters $\{(\mu^k, \wedge^k)\}$ that represent the generative process of x.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
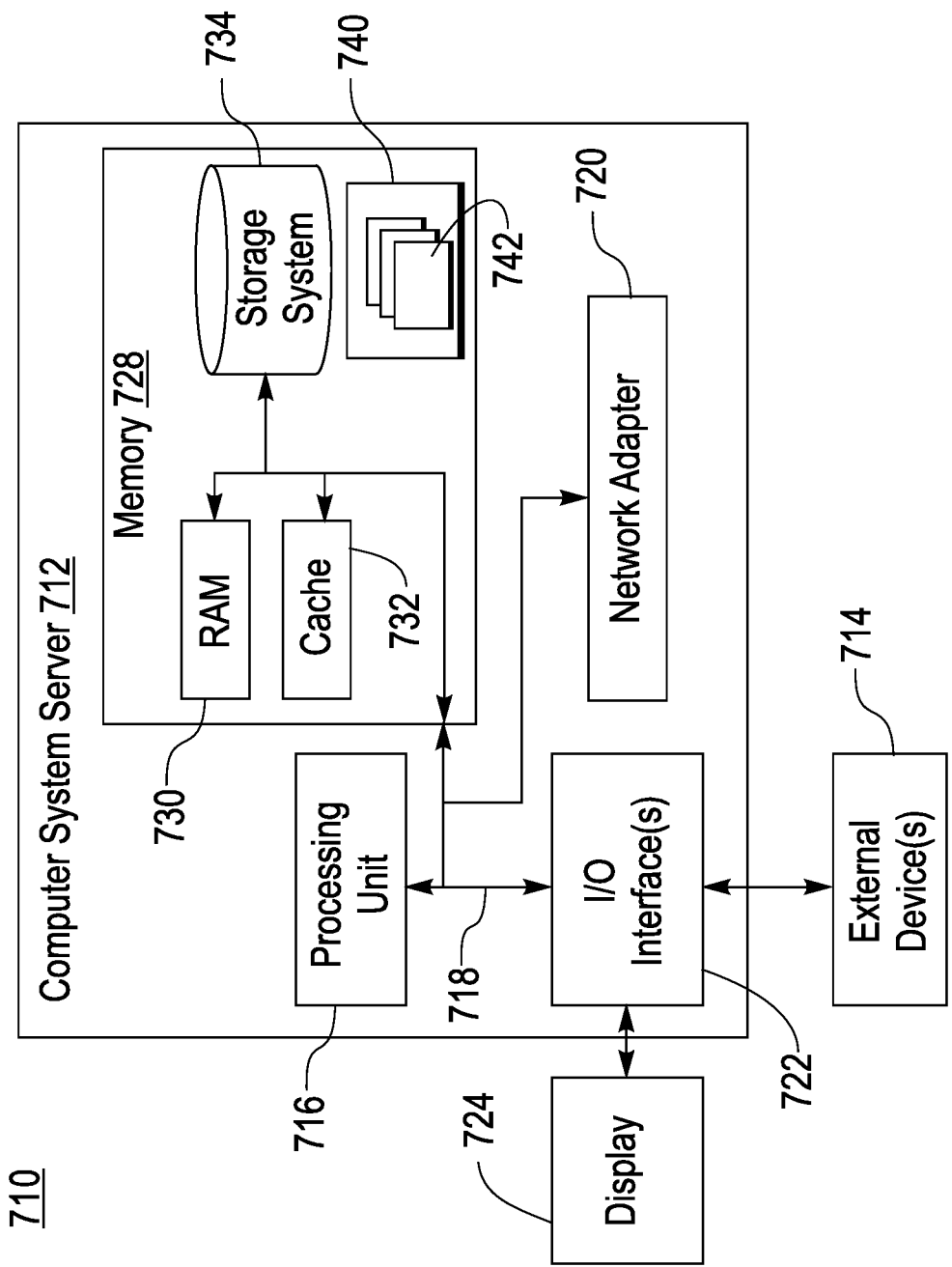
FIG. 7 is a schematic of an exemplary cloud computing node that implements an embodiment of the disclosure.

Referring now to FIG. 7, a schematic of an example of a cloud computing node is shown. Cloud computing node 710 is only one example of a suitable cloud computing node and is not intended to suggest any limitation as to the scope of use or functionality of embodiments of the disclosure described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the disclosure as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
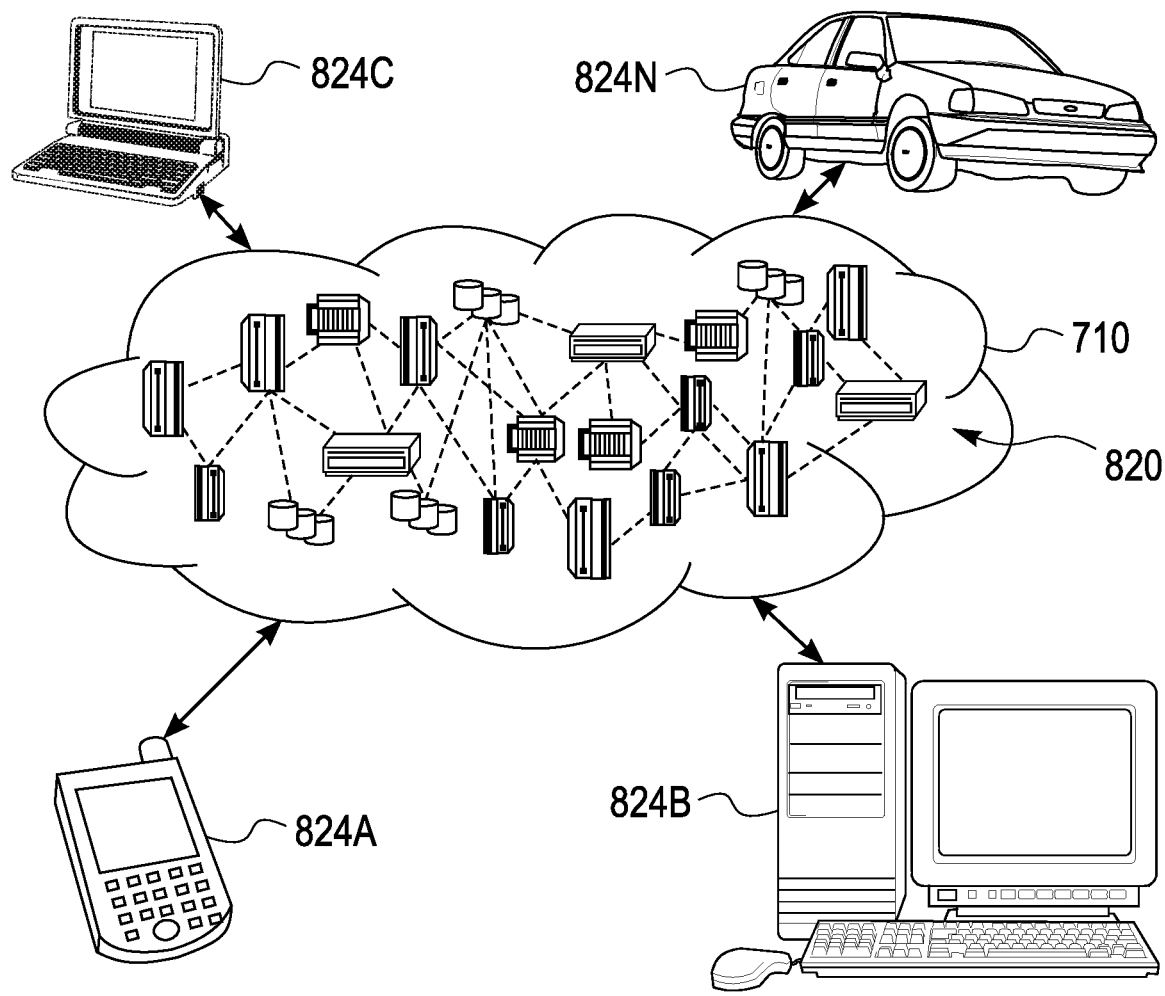
FIG. 8 shows an exemplary cloud computing environment according to embodiments of the disclosure.

Referring now to FIG. 8, illustrative cloud computing environment 820 is depicted. As shown, cloud computing environment 820 comprises one or more cloud computing nodes 710 with which local computing devices used by cloud consumers, such as, for example, personal digital assistant (PDA) or cellular telephone 824A, desktop computer 824B, laptop computer 824C, and/or automobile computer system 824N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 820 to offer infrastructure, platforms and/or software as services for which a cloud consumer does not need to maintain resources on a local computing device. It is understood that the types of computing devices 824A-N shown in FIG. 8 are intended to be illustrative only and that computing nodes 710 and cloud computing environment 820 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of detecting early indications of equipment failure in an industrial system, comprising the steps of:
   receiving sensor training data collected from industrial equipment under normal conditions and identifying periods of time in the sensor training data when the equipment was functioning normally, wherein the sensor training data includes samples of sensor values for a plurality of variables;
   finding a pattern for each identified period of time using a pattern detection algorithm to initialize an initial plurality of mixture models, wherein each mixture model of the initial plurality of mixture models is a function of the plurality of variables;
   iteratively learning weighting factors, arithmetic mean and variance of each of the initial plurality of mixture models, and removing from the initial plurality of mixture models those mixture models whose weights converge to 0, wherein a plurality of surviving mixture models remain;
   determining a Gaussian Markov random field (GMRF) model from the plurality of surviving mixture models by calculating gating functions for each of the variables and individual mixture models of the plurality of surviving mixture models;
   determining a threshold value of an anomaly score for each variable from the sensor training data; and
   deploying said GMRF model to monitor sensor data from industrial equipment using the threshold values to detect anomalous sensor data values that are indicative of an impending system failure.

2. The method of claim 1, wherein sensor training data for the identified periods of time, the initial plurality of mixture models, and arithmetic means and precisions of each of the plurality of surviving mixtures models are stored in a database.

3. The method of claim 1, wherein the learning weighting factors, arithmetic mean and variance of each of the plurality of mixture models comprises a maximum a posteriori estimation of a precision matrix for each model combined with a variational Bayes method.

4. The method of claim 3, wherein learning weighting factors, arithmetic mean and variance of each of the plurality of mixture models comprises:
   initializing an arithmetic mean, a covariance matrix, and a mixture weight for each of the plurality of mixture models;
   initializing a responsibility $r_k^{(n)}$ for each sample n of the sensor training data and each mixture k as a weighted product of the mixture weight for each mixture model and a normal probability distribution of each sample of the sensor training data for each mixture;
   calculating, for each mixture k, a mixture fraction $$N^k \leftarrow \sum_{n=1}^{N} r_k^{(n)},$$

a mixture weight $$\pi_k \leftarrow \frac{N^k}{N},$$

an arithmetic mean $$\mu^k \leftarrow \frac{1}{N^k} \sum_{n=1}^{N} r_k^{(n)} x^{(n)}$$

wherein $x^{(n)}$ is an n-th sample value, and a precision matrix $$\overline{\Lambda}^k \leftarrow \mathrm{argmax}_{\Lambda^k} \left\{ \ln|\Lambda^k| - Tr\left(\Lambda^k \sum^k\right) - \frac{\rho}{N^k} \|\Lambda^k\|_1 \right\} \text{ wherein}$$

$$\sum^k \leftarrow \frac{1}{N^k} \sum_{n=1}^{N} r_k^{(n)} (x^{(n)} - \mu^k)(x^{(n)} - \mu^k)^T$$

and $\rho$ is an input constant,
wherein said calculations of the mixture weight, arithmetic mean, and precision matrix are repeated until said values converge.

5. The method of claim 4, wherein initializing the arithmetic mean and covariance matrix for each of the plurality of mixture models comprises training a single Gaussian model for sensor training data in each identified period of time.

6. The method of claim 1, wherein calculating gating functions for each of the variables and individual mixture models comprises initializing $N_k^i$ as a number of samples of the i-th variable in the k-th mixture model, and hyperparameter $\alpha_k$ for each mixture $$k \text{ as } \alpha_k = \begin{cases} 0 & \text{for } \pi_k = 0, \\ 1 & \text{otherwise,} \end{cases}$$

wherein $\pi_k$ is a mixture weight for each mixture k, calculating, for each mixture k, a first parameter $\alpha_k^i \leftarrow \alpha_k + N_k^i$, a second parameter $\overline{\theta}_k^i \leftarrow \exp\{\psi(\alpha_k^i) - \psi(\overline{\alpha^i})\}$ wherein $$\overline{\alpha}^i = \sum_{k=1}^{K} \alpha_k^i$$

wherein K is a number of models and $\psi(\ )$ is digamma function, a gating function $$g_k^{(n)} \leftarrow \frac{\overline{\theta}_k^i N(x_i^{(n)} | u_i^k, w_i^k)}{\sum_{l=1}^{K} \overline{\theta}_l^i N(x_i^{(n)} | u_i^l, w_i^l)}$$

for all samples n wherein $N(x_i^{(n)}|u_i^k,w_i^k)$ is a normal probability distribution of each sample $x_i^{(n)}$ of the sensor training data for each mixture with arithmetic mean $u_i^k$ and variance $w_i^k$, and the number of samples of the i-th variable $$N_i^k \leftarrow \sum_{n=1}^{N} g_k^{i(n)},$$

wherein said calculations of the first parameter, the second parameter, gating function, and the number of samples of the i-th variable are repeated until said values convergence.

7. The method of claim 1, wherein the anomaly score for each variable i is $$a_i(x) = a_i(x) =$$

$$-\ln p(x_i | x_1, \ldots, x_{i-1}, x_{i+1}, \ldots, x_M) \approx -\ln \sum_{k=1}^{K} g_k^i(x) N(x_i | u_i^k, w_i^k),$$

wherein $p(x_i|x_1, \ldots, x_{i-1}, x_{i+1}, \ldots, x_M)$ is a conditional probability density function for the i-th variable $x_i$ given the remaining variables $x_1, \ldots, x_{i-1}, x_{i+1}, \ldots, x_M$, $g_k^i(x)$ is the gating function for the i-th variable and the k-th model, and $N(x_i|u_i^k,w_i^k)$ is a normal probability distribution of sample $x_i$ of the sensor training data for each mixture with arithmetic mean $u_i^k$ and variance $w_i^k$.

8. The method of claim 7, wherein determining a threshold value of an anomaly score for each variable comprises receiving a new set of sensor data samples comprising pairs of x and a label indicative of whether each sensor data sample is anomalous or not, and selecting a best pair of a threshold and a scale parameter $\rho$ of a prior distribution of the variance of the new set of sensor data samples.

9. A non-transitory program storage device readable by a computer, tangibly embodying a program of instructions executed by the computer to perform the method steps for detecting early indications of equipment failure in an industrial system, comprising the steps of:

receiving sensor training data collected from industrial equipment under normal conditions and identifying periods of time in the sensor training data when the equipment was functioning normally, wherein the sensor training data includes samples of sensor values for a plurality of variables;

finding a pattern for each identified period of time using a pattern detection algorithm to initialize an initial plurality of mixture models, wherein each mixture model of the initial plurality of mixture models is a function of the plurality of variables;

iteratively learning weighting factors, arithmetic mean and variance of each of the initial plurality of mixture models, and removing from the initial plurality of mixture models those mixture models whose weights converge to 0, wherein a plurality of surviving mixture models remain;

determining a Gaussian Markov random field (GMRF) model from the plurality of surviving mixture models by calculating gating functions for each of the variables and individual mixture models of the plurality of surviving mixture models;

determining a threshold value of an anomaly score for each variable from the sensor training data; and deploying said GMRF model to monitor sensor data from industrial equipment using the threshold values to detect anomalous sensor data values that are indicative of an impending system failure.

10. The computer readable program storage device of claim 9, wherein sensor training data for the identified periods of time, the initial plurality of mixture models, and arithmetic means and precisions of each of the plurality of surviving mixtures models are stored in a database.

11. The computer readable program storage device of claim 9, wherein the learning weighting factors, arithmetic mean and variance of each of the plurality of mixture models comprises a maximum a posteriori estimation of a precision matrix for each model combined with a variational Bayes method.

12. The computer readable program storage device of claim 11, wherein learning weighting factors, arithmetic mean and variance of each of the plurality of mixture models comprises:

initializing an arithmetic mean, covariance matrix, and a mixture weight for each of the plurality of mixture models;

initializing a responsibility $r_k^{(n)}$ for each sample n of the sensor training data and each mixture k as a weighted product of the mixture weight for each mixture model and a normal probability distribution of each sample of the sensor training data for each mixture;

calculating, for each mixture k, a mixture $$N^k \leftarrow \sum_{n=1}^{N} r_k^{(n)},$$

a mixture weight $$\pi_k \leftarrow \frac{N^k}{N},$$

an arithmetic mean $$\mu^k \leftarrow \frac{1}{N^k} \sum_{n=1}^{N} r_k^{(n)} x^{(n)}$$

wherein $x^{(n)}$ is an n-th sample value, and a precision matrix $$\overline{\Lambda}^k \leftarrow \operatorname{argmax}_{\Lambda^k} \left\{ \ln|\Lambda^k| - Tr\left(\Lambda^k \sum^k\right) - \frac{\rho}{N^k} \|\Lambda^k\|_1 \right\} \text{ wherein}$$

$$\sum^k \leftarrow \frac{1}{N^k} \sum_{n=1}^{N} r_k^{(n)} (x^{(n)} - \mu^k)(x^{(n)} - \mu^k)^T$$

and ρ is an input constant,
wherein said calculations of the mixture weight, arithmetic mean, and precision matrix are repeated until said values converge.

13. The computer readable program storage device of claim 12, wherein initializing the arithmetic mean and covariance matrix for each of the plurality of mixture models comprises training a single Gaussian model for sensor training data in each identified period of time.

14. The computer readable program storage device of claim 9, wherein calculating gating functions for each of the variables and individual mixture models comprises
initializing $N_k^i$ as a number of samples of the i-th variable in the k-th mixture model, and a hyperparameter $\alpha_k$ for each mixture k as $$\alpha_k = \begin{cases} 0 & \text{for } \pi_k = 0, \\ 1 & \text{otherwise,} \end{cases}$$

wherein $\pi_k$ is a mixture weight for each mixture k, calculating, for each mixture k, a first parameter $\alpha_k^i \leftarrow \alpha_k + N_k^i$, a second parameter $\overline{\theta}_k^i \leftarrow \exp\{\psi(\alpha_k^i) - \psi(\overline{\alpha}^i)\}$ wherein $$\overline{\alpha}^i = \sum_{k=1}^{K} \alpha_k^i$$

wherein K is a number of models and ψ( ) is digamma function, a gating function $$g_k^{(n)} \leftarrow \frac{\overline{\theta}_k^i N(x_i^{(n)} | u_i^k, w_i^k)}{\sum_{i=1}^{K} \overline{\theta}_l^i N(x_i^{(n)} | u_i^l, w_i^l)}$$

for all samples n wherein N $(x_i^{(n)}|u_i^k, w_i^k)$ is a normal probability distribution of each sample $x_i^{(n)}$ of the sensor training data for each mixture with arithmetic mean $u_i^k$ and variance $w_i^k$, and the number of samples of the i-th variable $$N_i^k \leftarrow \sum_{n=1}^{N} g_k^{i(n)},$$

wherein said calculations of the first parameter, the second parameter, gating function, and the number of samples of the i-th variable are repeated until said values convergence.

15. The computer readable program storage device of claim 9, wherein the anomaly score for each variable i is $\alpha_i(x) = \alpha_i(x) = -\ln p(x_i|x_1, \ldots, x_{i-1}, x_{i+1}, \ldots, x_M) \approx -\ln \Sigma_{k=1}^{K} g_k^i(x) N(x_i|u_i^k, w_i^k)$, where $p(x_i|x_1, \ldots, x_{i-1}, x_{i+1}, \ldots, x_M)$ is a conditional probability density function for the i-th variable $x_i$ given the remaining variables $x_1, \ldots, x_{i-1}, x_{i+1}, \ldots, x_M$, $g_k^i(x)$ is the gating function for the i-th variable and the k-th model, and $N(x_i|u_i^k, w_i^k)$ is a normal probability distribution of sample $x_i$ of the sensor training data for each mixture with arithmetic mean $u_i^k$ and variance $w_i^k$.

16. The computer readable program storage device of claim 15, wherein determining a threshold value of an anomaly score for each variable comprises receiving a new set of sensor data samples comprising pairs of x and a label indicative of whether each sensor data sample is anomalous or not, and selecting a best pair of a threshold and a scale parameter ρ of a prior distribution of the variance of the new set of sensor data samples.

* * * * *